United States Patent Office 3,847,957
Patented Nov. 12, 1974

3,847,957
CHROMYL BIS-(TRIORGANOTITANATES) AND
RELATED COMPOUNDS
David E. Boone, Downers Grove, Ill., assignor to
Standard Oil Company, Chicago, Ill.
No Drawing. Original application Mar. 24, 1972, Ser. No. 237,922, now Patent No. 3,752,795. Divided and this application Feb. 20, 1973, Ser. No. 334,009
Int. Cl. C07f 7/28
U.S. Cl. 260—429.5
6 Claims

ABSTRACT OF THE DISCLOSURE

Chromyl bis(triorganotitanates) and related compositions are prepared from a chromium oxide and an organotitanium compound and, when combined with an organoaluminum compound, are useful for the polymerization of olefins.

---

This is a division of application, Ser. No. 237,922, filed Mar. 24, 1972, now U.S. Pat. No. 3,752,795.

SUMMARY OF THE INVENTION

This invention relates to the catalyst polymerization of olefin hydrocarbons and more particularly to a process and catalyst therein for the polymerization of terminally unsaturated hydrocarbons. Still more particularly, the invention relates to a polymerization process utilizing a catalyst system comprising an organoaluminum compound and novel chromium-organotitanate compositions.

In accordance with the instant invention, olefins are polymerized to normally solid polymers at atmospheric pressure and above and at moderate temperatures and above with a catalyst system comprising (a) an organic-solvent-soluble composition prepared by reaction of an organotitanate with a chromium oxide at elevated temperatures in an inert solvent and, (b) an organoaluminum compound. The molecular weight distribution of the polymeric products formed by contacting an olefin with the above combination may be varied by changing the chromium to titanium ratio used.

BACKGROUND OF THE INVENTION

U.S. Pat. 3,474,080 discloses the utility of chromyl bis (organophosphates) combined with organoaluminum compounds as olefin catalysts, but shows only compounds containing a single transition element. South African patent application 662,674 discloses the use of silylchromates combined with alkyl aluminum alkoxides for the same purpose, but again compounds containing a single transition element are described.

Now it has been found that by preparing an organic-solvent-soluble composition in which two transition elements are present and activating it by an organoaluminum compound, olefins may be polymerized by contacting them with said compositions to form polymers having controllable molecular weight distributions.

STATEMENT OF THE INVENTION

In the process embodied herein, the catalyst system comprises (a) an organoaluminum compound and (b) a compound of the formula:

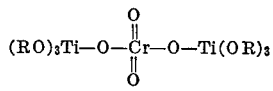

wherein R is a hydrocarbon radical, e.g., alkyl, alkaryl, aryl, cycloalkyl, or the like, or combinations thereof. As specific examples of compounds falling within the scope of the aforesaid formula and useful for the practice of this invention are the following: chromyl bis(tributyltitanate), which is prepared from tetrabutyltitanate; chromyl bis(tricyclohexyltitanate), which is prepared from tetracyclohexyltitanate; chromyl bis(triphenyltitanate), which is made from tetraphenyltitanate, chromyl bis(tribenzyltitanate), which is made from tetrabenzyltitanate; chromyl bis(tritolyltitanate), which is made from tetratolyltitanate. Especially preferred are compositions prepared from the tetraalkyl derivatives.

This novel composition of the instant invention is prepared by reacting a tetraorganotitanate of the formula $(RO)_4Ti$, wherein R is defined as above, with a chromium oxide at an elevated temperature in an inert solvent. Preferably, chromium (VI) oxide is used.

The reactants are heated in any suitable solvent that is resistant to oxidative attack by the chromium oxide. Examples of solvents include methylene chloride, carbon tetrachloride, chloroform, hexane, octane, cyclohexane, and decahydronaphthalene, and mixtures of these. In general the solvent is a saturated hydrocarbon of the halogenated, alkyl, or cycloalkyl variety having a reflux temperature between about 15° C. and about 90° C. at 1 atmosphere.

Although the chromium oxide, preferably chromium trioxide, and the tetraorganotitanate are reacted preferably in a mole ratio of about 5:1 to about 1:2, it is possible to use a ratio of chromium trioxide to the titanate of about 6:1 up to about 1:4. Any proportion lower than about 1:4 gives a small amount of usable product while anything above about 6:1 is wasteful of the chromium trioxide. The solvent is employed in the reaction in an amount sufficient to give a total concentration of about 0.1 to 5.0 moles with respect to the reactants in the reaction vessel.

When greater than a 1:2 mole ratio of chromium oxide, preferably $CrO_3$ to $(RO)_4Ti$ is used, it is presumed that a substantial proportion of polymeric material of the general formula:

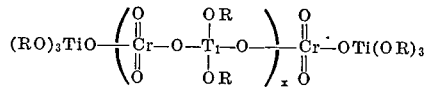

is formed. However, if $x$ in the above formula is larger than about five or six, the material is too insoluble in the organic solvent used for polymerization.

The reaction time can vary from a few minutes up to twenty-four hours or longer, but the usual reaction time for a high yield is approximately eight to twenty-four hours. The yield increases with time of reaction and is limited by the amount of reactants used.

The reaction temperature varies depending upon the solvent selected; however, the reflux temperature between about 15° C. and 90° C. is preferred. For example, when the solvent is carbon tetrachloride, the reaction temperature is about 77° C. at 1 atmosphere pressure.

In reference to the organoaluminum compound that is the other component of the catalyst system embodied herein, particularly suitable and preferred is a trialkylaluminum, such as triethylaluminum, tripropyl aluminum, triisobutyl aluminum, tri-n-decyl aluminum, and the like and dialkyl aluminum halides such as diethyl aluminum chloride.

The amount of the organoaluminum compound used depends upon the amount of the titanium-chromium composition used. Usefully, the organoaluminum compound mixed-transition-metal composition ratio varies from about 0.1 to about 5:1. More preferably, it varies from about 0.5 to about 3:1 and, most preferably, a ratio of 1 to 3:1 is desired.

Reaction conditions at which the polymerization may be carried out with the novel catalyst system include the following: A temperature of about 0° C. to about 250° C., preferably, about 20° C. to about 110° C., most preferably, about 20° C. to about 90° C., is used. A pressure of about 40 p.si.g. to about 5,000 p.s.i.g., preferably, about 60 p.s.i.g. to about 1,000 p.s.i.g., most preferably, about 100 to about 700 p.s.i.g., is used.

The total catalyst concentration is not critical, but usefully is about 0.01 to 5 grams of catalyst product per liter of solvent in the reaction vessel or about 0.001 to 1.0 percent, based on the weight of the olefin used. By total catalyst is meant here the titanium-chromium composition plus the organoaluminum compound.

A chain terminating agent such as hydrogen is advantageously used with the instant compositions during polymerization since its effect on the molecular weight distributions of the polymers prepared may be controlled by controlling the titanium to chromium ratio in the catalyst. The molecular weight of the resulting polymer using chromium-based olefin catalysts is considerably less affected by hydrogen than the molecular weights of polymers produced by titanium-based olefin catalysts.

The titanium-chromium compositions of the instant invention can be used either in solution or as a solid, alone or supported on an inert support material such as alumina or silica. In either of the above physical forms, it can be used also in a slurry (particle form) process or at more elevated temperatures in a solution form process or to polymerize olefin directly from the liquid state (bulk type of process) or the vapor state. Preferably, it is used in solution to polymerize olefins in a solution type or particle form type of process.

It is preferred that the selected reaction medium be essentially free of impurities which may react to destroy catalyst activity or which copolymerize with the olefinic hydrocarbon; that is, appreciable quantities of materials such as carbon dioxide, oxygen, and acetylenic compounds should preferably be absent.

Monomers within the contemplation of this invention are ethylene and terminal olefins containing 3–10 carbon atoms and diolefins such as butadiene.

For this process the polymerizable hydrocarbon may be used in substantially pure form, or there may be used a mixture containing major quantities thereof, provided no impurities are present in substantial amount to destroy the catalyst and/or contaminate the polymer products. For instance, ethylene obtained by the cracking of hydrocarbon streams is satisfactory if acetylenic and oxygenated materials are not present in more than trace amounts.

In carrying out the polymerization process described herein, it is highly desirable to maintain the polymerization zone free of extraneous gases. This can be done by keeping the reactor blanketed at all times with an inert gas, e.g., operating with an inert gas such as nitrogen, argon or helium. Preferably, the reactor and its contents are blanketed with the polymerization substance, e.g., ethylene gas, to avoid unnecessary dilution of the reactor contents with inert gases.

To describe the invention further, the following examples set forth specific embodiments of catalyst systems embodied herein for polymerizing olefins to high molecular weight polymers. In these Examples inherent viscosities were measured in Decalin at 135° C. at a concentration of 0.1 grams per 100 milliliters of solvent. Hexane extractables were measured using a Soxhlet type of extraction process. Annealed densities were measured after the sample was slowly cooled overnight from 150° C. Melt indices were measured according to ASTM D 1238. All molecular weights, $\overline{M}w$ and $\overline{M}n$ values were obtained by gel permeation chromatography.

EXAMPLE I

In a typical catalyst preparation reaction, 2.0 grams of anhydrous chromium trioxide was placed in 120 milliliters of carbon tetrachloride and 15 milliliters of tetrabutyltitannate was added. The system was heated to reflux for twenty-four hours with stirring. The green reaction mixture was filtered to remove the unreacted chromium trioxide. Care was taken throughout to eliminate water from the system. Desirably, light should be kept away from the reaction mixture and products.

EXAMPLE II

For the polymerization of ethylene, 2 milliliters of the filtered catalyst reaction mixture of Example I was added to 180 milliliters of polymerization grade hexane in a Fisher Porter bottle. While stirring, 2.6 millimoles of aluminum triethyl was introduced (all work was done under argon). The reaction vessel was fitted with a pressure head and the system was heated to 70° C. Ethylene was introduced to a total system pressure of 100 p.s.i.g. The reaction temperature was maintained at 80° C. during the one hour reaction period. On termination of the reaction, 4.9 grams of polyethylene was recovered.

EXAMPLE III

In an inert atmosphere, a 4.0 gram portion of reagent grade anhydrous chromium trioxide was placed in a flask containing 100 milliliters of carbon tetrachloride. A 75 milliliter portion of tetrabutyltitanate was added and with stirring the mixture was heated to reflux for twenty-four hours. The green reaction mixture was cooled and filtered to remove unreacted chromium trioxide.

Ten milliliters of the above solution was analyzed and found to contain 94.5 milligrams of chromium and 102 milligrams of titanium.

EXAMPLE IV

Under an inert atmosphere, 5.55 grams of reagent grade anhydrous chromium trioxide was added to 100 milliliters of dry carbon tetrachloride in a flask. A 3.7 milliliter portion of tetrabutyltitanate was added and with stirring the mixture was heated at reflux for seventy-two hours. The green reaction mixture was cooled and the supernatant liquid was separated from unreacted chromium trioxide by syringing. The solution was more viscous than in Example III.

EXAMPLE V

A 4.01 gram portion of reagent grade anhydrous chromium trioxide was added to a flask containing 90 milliliters of dried carbon tetrachloride. A 7.5 milliliter portion of tetrabutyltitanate was added and the mixture was heated at reflux for eighteen hours. The green reaction mixture was cooled and the liquid layer was separated from the unreacted chromium trioxide by syringing.

EXAMPLE VI

Under an inert atmosphere, a 4.45 gram portion of reagent grade anhydrous chromium trioxide was added to 90 milliliters of dried hexane in a flask. With stirring, 8.3 milliliters of tetrabutyltitanate was added and the reaction mixture was heated at 63° C. for twenty-four hours. After cooling, the green solution was syringed into another flask to separate it from the unreacted chromium trioxide.

EXAMPLE VII

A 1.93 gram portion of reagent grade magnesium hydroxide powder was dried for twenty-four hours at 220° C. in a muffle furnace. This was added to 40 milliliters of dried hexane in a flask under an inert atmosphere. An 8.0 milliliter portion of the reaction mixture of Example V was added and with stirring this mixture was heated to 60° C. for eighteen hours. After cooling, the solid was washed with hexane. The solid remained green after one washing.

EXAMPLE VIII

A. Preparation of the $AlCl_3$—$Mg(OH)_2$ Support

A 4.01 gram portion of reagent grade magnesium hydroxide powder was mixed with 6.18 grams of reagent grade anhydrous aluminum chloride at room temperature. The mixture was then heated at 100° C. for eighteen hours. The hard reaction product was broken into small pieces and ball-milled for twenty-four hours.

B. Preparation of the Supported Catalyst

A 2.0 gram portion of the AlCl₃—Mg(OH)₂ product from part A was placed in a flask with 45 milliliters of dried xylene. To this was added 10 milliliters of the reaction product from Example V. The mixture was heated to 90° C. for six hours with stirring. The reaction mixture was cooled and the solid was washed with 40 milliliters aliquots of dried hexane six times.

EXAMPLE IX

Into a 500 milliliter, dried rocking bomb was charged 150 milliliters of hexane under 50 p.s.i.g. of a feed gas containing 2 mole percent hydrogen and 90 mole percent ethylene. The system was slowly vented and at atmospheric pressure, a 2 milliliter portion of the catalyst solution of Example III was introduced. The system was closed and 2.7 millimoles of triethylaluminum in 30 milliliters of hexane was charged under feed gas pressure. With the reaction mixture temperature at 78° F., the system was pressured to 320 p.s.i.g. There was an immediate temperature rise to 90° F. The pressure was maintained at 400–430 p.s.i.g. throughout the one hour and forty minute reaction time. The reaction temperature was slowly increased to 180° F.

A 33 gram amount of polymer was formed. The inherent viscosity of the polymer was 2.6. The product contained 4.2 weight percent hexane extractables after five hours of extraction.

EXAMPLE X

A 500 milliliter, stainless steel, stirred reaction was dried at 100° C. for one hour, cooled and evacuated. The vacuum was broken by pressuring 174 milliliters of dry hexane into the reaction with 200 p.s.i.g. of ethylene. The hexane was stirred and cooled to room temperature and the system was then vented to atmospheric pressure. A 1.0 milliliter portion of the catalyst solution of Example III was added. The system was closed, pressured to 50 p.s.i.g. with ethylene, stirred for one minute, and vented to atmospheric pressure. A 2.0 millimole amount of triethylaluminum in 10 milliliters of hexane was added. The system was sealed and pressured to 585 p.s.i.g. with ethylene. The temperature slowly rose to 74° C. during the polymerization. After 1.5 hours, the system was vented.

A 63 gram amount of polymer was recovered. The polymer had an inherent viscosity of 11, an unannealed density of 0.949 grams per milliliter and an annealed density of 0.957 grams per milliliter. After extracting six hours with hexane, the product showed a 6.8 percent weight loss.

EXAMPLE XI

A 500 milliliter, stainless steel, stirred reactor was heated at 100° C. overnight with a nitrogen purge. The system was evacuated and cooled to 24° C. The vacuum was broken by pressuring 174 milliliters of dry hexane into the reactor with 200 p.s.i.g. of ethylene. The system was vented to atmospheric pressure and 1.0 milliliters of the catalyst solution was introduced. (This solution was the same as but only 0.1 as concentrated as that used in Example X.) This solution was stirred for two minutes and 0.39 millimoles of triethylaluminum were introduced. The system was immediately pressured to 580 p.s.i.g. with ethylene. The reaction temperature rose from 24° C. to 38° C. during the one hour forty minute reaction.

An 11.0 gram amount of polymer was recovered. The product showed an inherent viscosity of 27, an unannealed density of 0.948, an annealed density of 0.960 and contained 5.5 weight percent hexane extractables after five hours.

EXAMPLE XII

A 500 milliliter, stainless steel, stirred reactor was heated overnight at 135° C. with a nitrogen purge. The system was evacuated and the vacuum was broken by charging 160 milliliters of dried hexane pressured with 50 p.s.i.g. of ethylene. The temperature of the solution was vented to atmospheric pressure. An 0.5 milliliter portion of the catalyst from Example V was introduced followed by 1.9 millimoles of triethylaluminum in 10 milliliters of hexane. The system was immediately pressured to 600 p.s.i.g. with ethylene. The reaction temperature was slowly increased to 88° C. during the 1.5 hour run.

A 6.49 gram amount of polymer was recovered. The polymer had an inherent viscosity of 15.

EXAMPLE XIII

A 500 milliliter, stainless steel, stirred reactor was heated at about 130° C. for three hours with a nitrogen purge. The system was evacuated and the vacuum was broken by charging 160 milliliters of dried hexane with 50 p.s.i.g. of ethylene. The temperature of the solution was stabilized at 27° C. and the system was vented to atmospheric pressure. About 40 milligrams of the catalyst from Example VII was added followed by 0.15 millimoles of triethylaluminum. The system was then pressured to 600 p.s.i.g. with ethylene. The reaction temperature was slowly increased to 82° C. during the one hour run.

A 3.9 gram portion of polymer was recovered.

EXAMPLE XIV

A 500 milliliter, stainless steel, stirred reactor was heated at 127° C. overnight with a nitrogen purge. The system was evacuated and the vacuum was broken by charging 160 milliliters of dried hexane with 50 p.s.i.g. of ethylene. The temperature of the solution was stabilized at 71° C. and the system was vented to atmospheric pressure. About 14 milligrams of the catalyst from Example VIII was added to the reactor followed by an 0.8 milliliter of a solution containing 0.15 millimoles of triethylaluminum. The system was pressured to 600 p.s.i.g. with a feed gas containing 25 mole percent hydrogen and 75 mole percent ethylene. After six minutes this was switched to 100 percent ethylene fed on demand at 600 p.s.i.g. The polymerization temperature was maintained at 82° C. during the one hour run.

A 15.2 gram amount of polymer was recovered for a yield of 1,080 grams of polymer per gram of catalyst. The polymer product had an inherent viscosity of 2.4, an unannealed density of 0.959, an annealed density of 0.973, a melt index of 0.5 grams per 10 minutes and a $\overline{M}w/\overline{M}n$ of 7.0.

While the invention has been described in conjunction with specific examples, it is to be understood that these are for illustrative purposes only. Many alternatives, modifications and variations will be apparent to those skilled in the art in light of the foregoing description, such alternatives, modifications and variations falling within the spirit and scope of the appended claims.

Having thus described the invention, what is claimed is:

1. A compound of the formula:

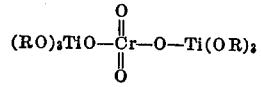

wherein R is a hydrocarbon radical selected from the group consisting of alkyl, alkaryl, aryl and cycloalkyl radicals.

2. The compound of Claim 1 wherein R is a hydrocarbon radical selected from the group consisting of cyclohexyl, benzyl, phenyl and tolyl.

3. The compound of Claim 1 wherein R is butyl.

4. An organic-solvent soluble composition made by reacting a tetraorganotitanate of formula $(RO)_4Ti$, wherein R is a hydrocarbon radical selected from the group consisting of alkyl, alkaryl, aryl cycloalkyl and combinations thereof, with chromium (VI) oxide between about 15° C. and 90° C. in a solvent resistant to oxidative attack from said oxide and wherein the mol ratio of said chromium (VI) oxide to said tetraorganotitanate runs from about 6:1 to about 1:4.

5. The composition of Claim 4 wherein said R is a hydrocarbon radical selected from the group consisting of cyclohexyl, benzyl, phenyl and tolyl.

6. The composition of Claim 4 wherein R is a butyl radical.

References Cited
UNITED STATES PATENTS 3,046,267    7/1962    Cohen et al. _____ 260—429.5

OTHER REFERENCES

Chem. Abstracts, vol. 53, 9148a (1959).
Chem. Abstracts, vol. 63, 702b (1965).
Chem Abstracts, vol. 66, 38325k, 105347 (1967).
Chem. Abstracts, vol. 67, 64856z (1967).

H. M. S. SNEED, Primary Examiner

U.S. Cl. X.R.

252—431 R; 260—88.2 R, 93.7, 94.3, 94.9 B

PO-1050
(5/69)

UNITED STATES PATENT OFFICE
CERTIFICATE OF CORRECTION

Patent No. 3,847,957                     Dated   November 12, 1974

Inventor(s)  David E. Boone

It is certified that error appears in the above-identified patent and that said Letters Patent are hereby corrected as shown below:

Column 4 in Example III - line 20 - 75 milliliter should read: 7.5 milliliter

Signed and sealed this 8th day of April 1975.

(SEAL)
Attest:

RUTH C. MASON
Attesting Officer

C. MARSHALL DANN
Commissioner of Patents
and Trademarks